United States Patent [19]
Oliphant

[11] 4,106,236
[45] Aug. 15, 1978

[54] FIRE DOOR FOR TRAILERS

[75] Inventor: Howard G. Oliphant, Sparks, Nev.

[73] Assignees: H. W. Kochs, Jr.; R. M. Geer, both of Medina, Ohio; Lois Jean Cason, Reno, Nev.

[21] Appl. No.: 782,632

[22] Filed: Mar. 30, 1977

[51] Int. Cl.² .......................................... E05C 15/02
[52] U.S. Cl. .......................................... 49/141; 49/465; 49/261
[58] Field of Search .................. 49/141, 261, 463, 465

[56] References Cited

U.S. PATENT DOCUMENTS

| 2,753,964 | 7/1956 | Carnick | 49/261 |
| 2,830,843 | 4/1958 | Seaburg et al. | 49/141 X |
| 3,120,032 | 2/1964 | Burnette | 49/141 X |
| 3,992,052 | 11/1976 | Green | 49/141 X |

FOREIGN PATENT DOCUMENTS 2,030,158  12/1971  Fed. Rep. of Germany ............ 49/261

Primary Examiner—Kenneth Downey
Attorney, Agent, or Firm—Warren F. B. Lindsley

[57] ABSTRACT

A push-out fire door for the side walls of trailers or the like providing egress from the trailer by quick release of a latch inside of the trailer holding the door to the trailer walls and a slight push on the door causing it to pivot outwardly of the trailer dislodging therefrom and falling away from the side of the trailer.

2 Claims, 4 Drawing Figures

FIRE DOOR FOR TRAILERS

BACKGROUND OF THE INVENTION

This invention relates to knock-out or push-out fire doors for house trailers or the like and particularly to a novel safety release and mounting means for the fire door to facilitate quick and easy exit from the trailer.

Among the hazards of trailer use for human housing or camping purposes is the quick exodus therefrom in the case of fire or any other life-affecting danger. Many trailers have only one exit and others contain an emergency exit at a side of the vehicle which may be difficult to use because of furniture or luggage storage. Other trailers have provided the emergency exit at a distance from its floor which is difficult to reach.

DESCRIPTION OF THE PRIOR ART

A number of fire or safety devices have been provided for vehicle use but none of them offer the convenience of mounting the disclosed fire or safety exit door at any place in the side or end of the vehicle or trailer which may be safety locked to form a firm part of the side wall of the vehicle or trailer but easily unlatched to be pushed out of its containing position to fall away from the vehicle or trailer with little effort thereby providing an easily obtained exit.

U.S. Pat. Nos. 2,389,315; 2,639,790 and 2,697,003 disclose safety exits from vehicles, but all of them are formed into the vehicle when made and may be unaccessible because they are not at floor level, the most desirable place to be when escaping from a fire within the vehicle.

U.S. Pat. Nos. 2,660,274; 3,571,955 and 3,694,003 disclose further pressure release windows and panels including release means, but none of these patents disclose a suitable fire door which may be easily mounted adjacent the floor of the vehicle or trailer in original or retrofitted equipment.

While the foregoing patents accomplish in varying degrees the broad exit function of the present invention, they fall short of being totally satisfactory in a number of respects.

SUMMARY OF THE INVENTION

In accordance with the invention claimed, a new and improved fire door is provided which may be readily provided in new and retrofitted equipment which is floor-mounted and easily released to drop away from the outside surface of the vehicle.

It is, therefore, one object of this invention to provide a new and improved fire door for vehicles such as trailers or the like.

Another object of this invention is to provide a new and improved fire door which drops away from its mounting when released.

A further object of this invention is to provide an improved fire door for vehicles such as camping and house trailers that may be readily mounted adjacent the floor of the vehicle in new and retrofitted equipment.

A still further object of this invention is to provide a hinged fire door for trailers or the like wherein the hinge parts after pivoting the door outwardly of the structure separate to release the door from its mounting.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
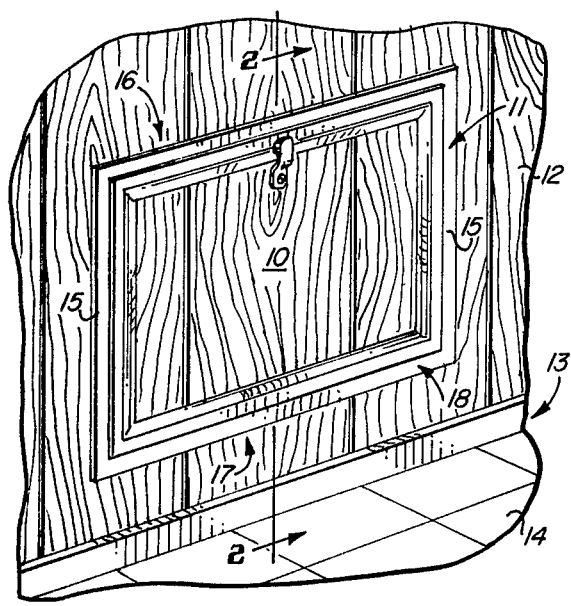
FIG. 1 is a partial perspective view of the fire door of the invention mounted in the paneling of a vehicle such as a camping or house trailer.
Figure 2:
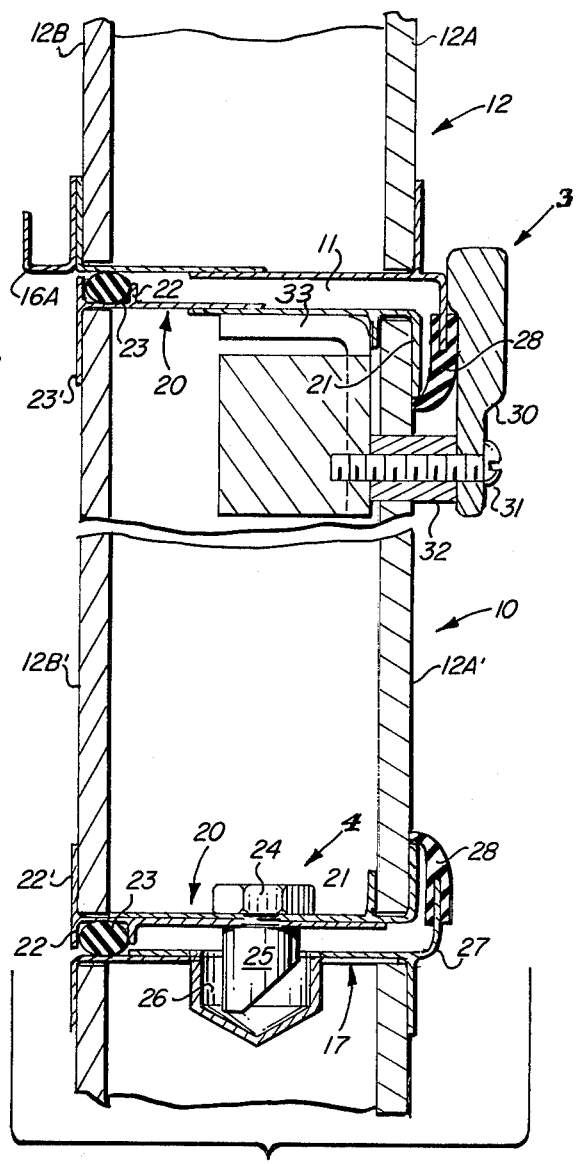
FIG. 2 is a cross-sectional view of FIG. 1 taken along the line 2—2.

Referring more particularly to the drawing by characters of reference, FIG. 1 discloses a fire door 10 mounted in an opening 11 formed in a wall 12 of a camping trailer, house trailer or the like near its floor 14. The opening 11 is framed by side members 15, header 16 and sill 17 of frame 18 which overlap the periphery of the opening on the inside of wall 12 formed by spaced members 12A and 12B. As shown in FIG. 2, the header 16 is provided with a rain trough 16A for catching water flowing down the outside walls 12B of the trailer thereby protecting opening 11 and the fire door 10 in the usual manner from the elements.

The fire door 10 comprising cutout portions 12A' and 12B' of the walls 12A and 12B of the trailer are framed by metal extrusions 20 having a U-shaped flange 21 on the inside of the trailer which cover the edges 12A' of the door and a U-shaped flange 22 extending outwardly of the outside of the door forming a seat for an O-ring 23. One leg 22' of flange 22 is extended, as shown in FIG. 2, to overlap the outside surface of wall 12B' of the door.

Figure 3:
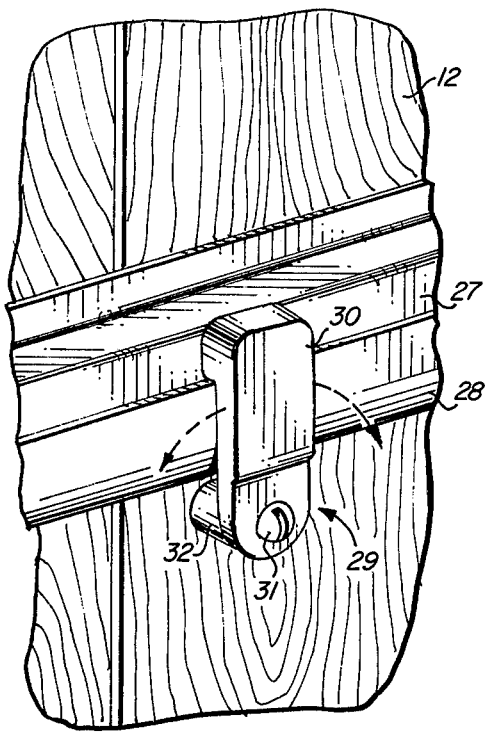
FIG. 3 is an enlarged view of the latching means and associated panel shown in FIGS. 1 and 2.
Figure 4:
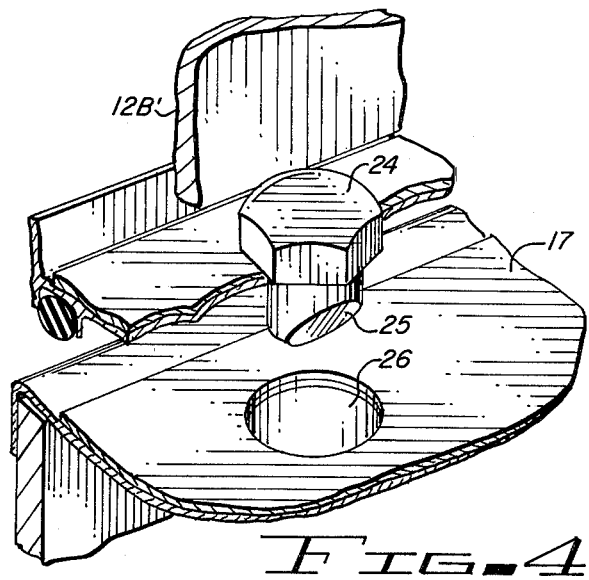
FIG. 4 is an enlarged partial view of the hinge means shown in FIG. 2.

As shown in FIGS. 2 and 3, fire door 10 is mounted in opening 11 by means of a stud or bolt 24 or spaced pair thereof, only one of which is shown for purposes of illustration, having its tapered end or shank 25 loosely fitted into a detent or opening 26 in sill 17 of the frame of opening 11.

The side members 15, header 16 and sill 17 are each provided with a flange 27 extending over the inside surface of the fire door, the outer edges of which are fitted with resilient fingers 28 which bear on the wall surface 12A of the fire door for sealing purposes in the manner shown.

To releasably lock the fire door in a wall sealing position, a suitable latch 29 is provided. This latch comprises a latch arm 30 rotatably mounted to the side wall 12A' of the fire door 10 by means of a bolt 31 which fits through a bushing 32 and threadedly engages with a flange 33 which is secured to the metal extrusion 20 of the fire door.

The latch arm 30 is intended to move over the surface of the flashing finger 28 of the flange 27 of the header 16 of the fire door frame and interlock with it in the closed position. To release the fire door from its closed position, it is merely necessary to rotate the latch arm 30 less than ninety degrees either side of the position shown in FIGS. 1, 2 and 3 and push outwardly on the fire door. The fire door will pivot about O-ring 23 and then dislodge shank 28 of bolt 24 from the socket or detent 26 releasing it from its door frame and causing it to fall away from the vehicle, opening a suitable exit from the vehicle for its occupants. The O-ring 23 along the outside edge of the vehicle not only seals the opening for weather purposes but provides a resilient pivot point for the door after bolt 25 leaves opening 26.

Although but a single embodiment of the invention has been illustrated and described, it will be apparent to those skilled in the art that various changes and modifications may be made therein without departing from the spirit of the invention or from the scope of the appended claims.

What is claimed is:

1. A fire door comprising a casing forming a door opening,
   said casing comprising side members, header and a sill,
   said sill being provided with an opening therein,
   a fire door mounted within said door opening and having a frame extending around its periphery,
   engagement means extending from the side of said frame juxtapositioned to said sill and within said opening forming a loose fit therewith,
   said engagement means comprising a bolt means, the end of said bolt means fitting into said opening being tapered for aiding in its movement out of said opening when the door is pushed away from its casing from a latch side thereof,
   a rotatable latch means mounted on said door for detachably interlocking with said header in a given position and when rotated to another position releasing said fire door from said casing,
   said side members, header and sill each being provided with a flange extending over the edge of said fire door on the latch-mounted side thereof,
   a resilient finger mounted on the edge of said flanges for engaging the surface of said fire door on the latch-mounted side thereof, and
   resilient means mounted on the edge of said frame adjacent said sill forming a pivot for said fire door,
   whereby a push on said fire door near said latch means will cause said fire door to rotate about an edge of said sill means causing said engagement means to move out of said opening and said fire door to drop away from said casing.

2. The fire door set forth in claim 1 wherein:
   said resilient means comprising an O-ring.

* * * * *